Feb. 15, 1966     C. O. MLČOH     3,234,998

METHOD OF MELTING MATERIALS AND APPARATUS THEREFOR

Filed Jan. 15, 1962     2 Sheets-Sheet 1

*INVENTOR.*
Carlo O. Mlčoh
BY *Donald C. Studley*

Feb. 15, 1966   C. O. MLČOH   3,234,998
METHOD OF MELTING MATERIALS AND APPARATUS THEREFOR
Filed Jan. 15, 1962   2 Sheets-Sheet 2

INVENTOR.
Carlo O. Mlčoh
BY
Donald C. Studley

United States Patent Office 3,234,998
Patented Feb. 15, 1966

3,234,998
METHOD OF MELTING MATERIALS AND APPARATUS THEREFOR
Carlo O. Mlčoh, Wilmington, Del., assignor to Atlas Chemical Industries, Inc., Wilmington, Del., a corporation of Delaware
Filed Jan. 15, 1962, Ser. No. 166,017
11 Claims. (Cl. 165—1)

The present invention relates to a method, and to a means for carrying out the method, of melting fusible solid materials. More particularly, the invention relates to a continuous method, and to a means for carrying out the continuous method, of melting solid substances which are transformed into liquids at moderately elevated temperatures.

The present invention provides a simple, economical and efficient method of melting fusible solid materials and a simple, compact apparatus for rapidly carrying out the method.

The present method and apparatus are suited to melt a wide range of fusible or thermoplastic materials. The fusible materials may initially be in any divided form, for instance, flakes, granules or powder. The term "divided solid material" as used herein is defined as a solid material in a separated form, such as, for example, flakes, granules or powder. Examples of materials that the present invention is particularly useful in melting are: fats, waxes, resins, gels, sulphur, bisphenol, naphthalene and orthoxylene.

According to the present invention, a continuous method of melting fusible solid materials is provided which comprises the steps of feeding a fusible divided solid material into a mass of molten material to form a slurry, agitating and propelling the slurry through a heated zone to melt the solid material, then removing some but not all of the formed melt, cycling the remainder of the melt to supply the molten material in the first step. In this manner, the present process provides both a supply of molten product and a supply of molten material which is utilized to mix with fresh divided fusible solid material to form fresh slurry. In a preferred form, the method is carried out in a loop or recirculating system. In such form, the loop is maintained at an elevated temperature by continuous heating. Molten material is circulated through the system. Molten material may be obtained in the system in the initial start-up by either charging the system with molten material or by charging the system with a fusible divided solid material or a slurry which may be heated in the system to form a melt. A fusible divided solid material is then continuously fed into the system to form a slurry with the molten material in the system and the slurry circulated through the heated system to form additional melt. A portion of the formed melt is removed. The portion of melt not removed is cycled in the system and utilized as the molten matrix material which in turn receives fresh divided fusible solid material to form fresh slurry. The fresh slurry in turn is exposed to the heated portion of the loop to form additional melt. Each step in the process is suited to be carried out continuously.

The present invention also provides a means of carrying out the melting process. In a preferred form, the melting means is a heat exchange device which comprises an outer shell which has side and end walls and an inner shell having side walls. Preferably the inner shell is cylindrical. The inner shell is mounted within the outer shell and is positioned in spaced relation thereto. The interior of the inner shell provides an interior chamber. The space between the inner and outer shells provides an outer chamber. A heat exchange conducting means is positioned in heat exchange relation to both of said chambers. Suitably the heat exchange conducting means may be comprised of a plurality of spaced tubes positioned in the outer chamber and in heat exchange relation by wall contact with the interior chamber, suitably the tubes are arranged parallel to the inner shell. A heat exchange medium, for example, steam or hot water, may be circulated through the spaced tubes to provide a heat source. A propulsion means is mounted through the inner shell and positioned to propel material through the interior chamber. In turn the propulsion means also propels material through the outer chamber. Preferably the propulsion means is in the form of a screw mounted on a rotatable shaft which will both agitate and propel material through the device. If desired, such a screw propulsion means may be heated, for example, by passing a heat exchange medium through the center of the screw shaft and, if desired, through the screw flights. Preferably the screw propulsion means is in the form a continuous screw flight helically mounted about a shaft. However, a screw propulsion means having a discontinuous screw flight positioned about a shaft may be utilized provided the flight portions are so mounted that rotation of the shaft propels material through the device. Preferably, the flight portion of the screw propulsion means extends the approximate length of the inner chamber, however, a shorter or longer screw flight length may be utilized provided that the propulsion means propels material through the device. The screw flights located adjacent the end of the interior chamber to which the screw propulsion means propel material may have a reverse pitch to reduce pressure on that end of the device and on a sealing means which may be located between the end wall of the device and the rotatable shaft. The screw flights at the end portion of the screw propulsion means may include fin structure adapted to propel material carried by the screw propulsion means outwardly from the discharge end of the screw propulsion means or to draw material into the screw propulsion means at the entry end. Although a screw propulsion means of uniform diameter is preferably used in the device, the screw propulsion means may have a smaller diameter contiguous to the region in which feed material enters the device. In such preferred arrangement mixing and a thorough wetting of the feed material is facilitated by the residual melt in the device. The interior and outer chambers communicate one with the other at points contiguous to the ends of the inner shell. Such communication may be facilitated by spacing the inner shell from the end walls of the outer shell at either end of the device to form a first and second header. In such arrangement the first header is designated as the header located adjacent the end of the interior chamber away from the end to which the screw propulsion device propels material. An inlet conduit enters the device through the outer shell and provides a means of feeding fusible divided solid material into the interior chamber. Preferably the inlet conduit opens into the interior chamber and is positioned to feed material at a point along the length of the screw propulsion means. An outlet conduit enters through the outer shell and provides a means of removing molten product from the device. Preferably the outlet conduit is positioned in the outer shell and opens into the region of the first header. To facilitate charging fusible solid materials into the device, the inlet conduit is preferably located so that the feed material may be gravity fed into the device.

As well as being useful in carrying out a continuous melting process, the device of the present invention is useful in operations where a melting process is carried out discontinuously, for instance where the process is stopped over night or over a week-end. Instead of draining the unit prior to shut-down, the feeding operation and the flow of heat exchange medium may be stopped and the charge allowed to cool and solidify in the device. To restart the melting process, hot heat exchange medium is passed through the device to melt the residual charge. After the residual charge is reduced to a melt, the feed operation is begun and melt is removed.

It will be understood that the present device may easily be adapted to separately receive a plurality of feed materials by merely adding additional inlets. Such an adaptation may be of value if it is desired to conduct a chemical reaction in the device under controlled temperature conditions. The present device is also readily adapted to maintain a quantity of material at a desired temperature level for an indefinite period of time by merely cycling the material through the device and maintaining the desired temperature by adjusting the heat exchange means. The present device is also adapted to cool liquids by propelling the hot liquid through the device and circulating a coolant through the heat exhange means. In some operations, particularly those which involve a further heat step, it may be desirable to produce a slurry product instead of a product which is completely molten. This may be accomplished by adjusting the flow or temperature of the heat exchange medium or by adjusting the speed at which the propulsion means propels material through the device.

The present invention will now be described with reference to the accompanying drawings which form a part of the present application. Like numerals refer to like parts in both views of the drawing and throughout the description.

Figure 1:
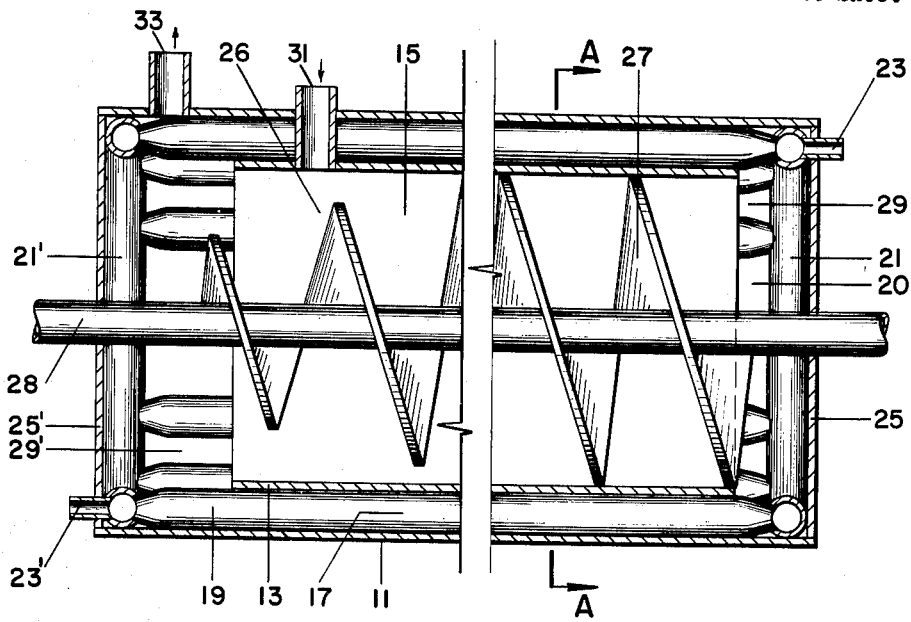
FIGURE 1 is a vertical cross-sectional view of an apparatus in accord with the present invention.

Looking now at the drawings in detail: FIGURE 1 shows the body of the apparatus which consists of an outer cylindrical shell 11 having end walls 25 and 25' and enclosing an inner cylindrical shell 13 which is spacedly positioned within the outer shell. The body of the device is usually suitably fabricated of metal such as iron, steel or brass. The interior of inner shell 13 forms interior chamber 15. The annular area between the outer shell 11 and the inner shell 13 forms an outer chamber 17. Outer chamber 17 contains a plurality of spacedly positioned tubes or ducts 19. The tubes 19 each join hollow annular rings 21 and 21' at either end of cylindrical shell 11. Annular ring 21 has an opening 23 through end wall 25 of shell 11 to receive steam or other heat exchange medium such as hot water therethrough. Steam under a pressure of about 175 pounds per square inch is aptly suited to melt bisphenol, naphthalene, orthoxylene, sulphur and a wide range of fusible fats, waxes and gels. Annular ring 21' has an opening 23' through end wall 25' of shell 11 to facilitate removal of condensate or cooled heating media from the device. It will, of course, be understood that the direction in which the heat exchange medium passes through the device is not critical and if desired, may be reversed by merely passing the heat exchange medium in opening 23' and removing it from opening 23. Tubes 19 are located in heat exchange relation to inner shell 13 by physical contact therewith. The area between tubes 19, bounded by the outside of tubes 19, the inside of the outer shell 11 and the outside of the inner shell 13 forms return ducts 20. Inner shell 13 has a screw propulsion means 27 mounted therethrough. Screw propulsion means 27 may be heated by passing a heat exchange medium, through shaft 28. In an embodiment wherein the screw flights are hollow, the heat exchange medium is passed therethrough by communication with hollow shaft 28. Inner shell 13 is spacedly positioned from end walls 25 and 25' of outer shell 11 forming headers 29 and 29'. Inlet conduit 31 is positioned through the side wall of outside shell 11 and opens into interior chamber 15 at a point 26 located over a portion of screw propulsion means 27 having a narrowed fin diameter. Outlet conduit 33 is positioned through the side wall of outside shell 11 and enters header 29'.

Figure 2:
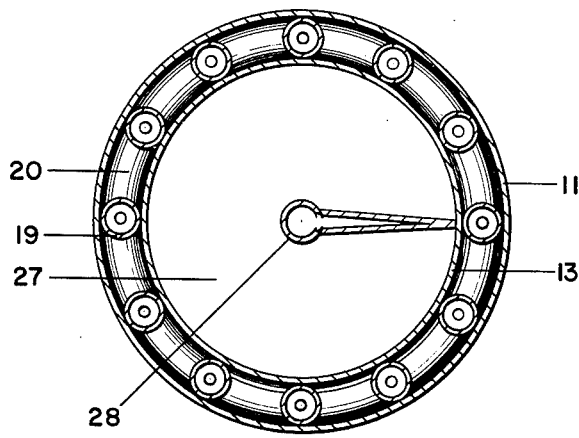
FIGURE 2 is a vertical cross-sectional view of the apparatus shown in FIGURE 1 taken along line A–A' of FIGURE 1.

FIGURE 2 is a cross section view taken along line A–A' of FIGURE 1. FIGURE 2 shows the outer shell 11 which spacedly encloses an inner shell 13. Tubes 19 are positioned in the annular area between the shells. As shown in FIGURE 2, tubes 19 may be utilized to space inner shell 13 from outer shell 11. Screw propulsion means 27 is positioned within the inner shell. FIGURE 2 better shows the return ducts 20 are located in the annular area between the shells and are bounded by the outside of tubes 19, the inside of shell 11, and the outside of shell 13.

Figure 3:
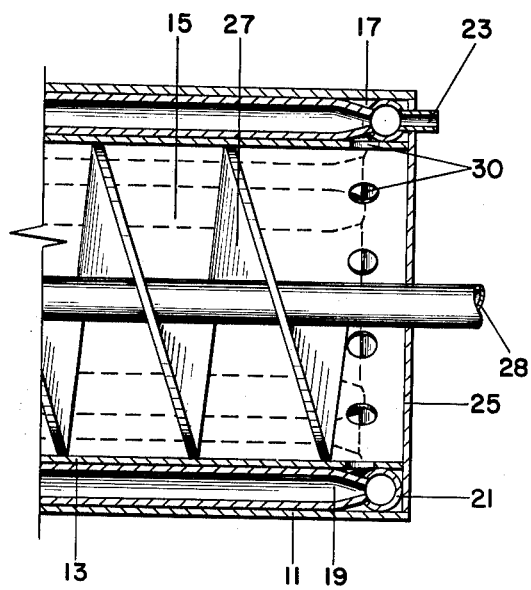
FIGURE 3 is a fragmentary vertical cross-sectional view illustrating a modification in the communication between the interior and outer chambers of the device.

FIGURE 3 is a fragmentary cross section view of a device similar to that shown in FIGURE 1. FIGURE 3 illustrates a modification which may be made in the means of communication between the interior and outer chambers of the device. Instead of a header, such as 29 shown in FIGURE 1, the side wall of the inner cylinder 13 is extended to meet end wall 25 of outer shell 11. The side wall of the inner cylinder 13 contains a plurality of ports 30 therethrough positioned contiguous to end wall 25 which facilitate communication between interior chamber 15 and outer chamber 17.

In operation the device is initially charged through inlet conduit 31 with a fusible divided material. A heat exchange medium, for example, steam, is passed through opening 23, through annular ring 21, tubes 19, annular ring 21' and out outlet 23'. Screw propulsion means 27 is rotated in a direction which moves the entering fusible divided material through interior chamber 15 toward end wall 25. As the initially charged feed material is moved through interior chamber 15, additional feed material is fed into the device through inlet conduit 31. The heat from the heat exchange medium passing through tubes 19 raises the temperature in interior chamber 15. At the elevated temperature of the inner chamber the entering feed material is mixed with and thoroughly wetted by molten material in the interior chamber to form a slurry. Screw propulsion means 27 acting through the entering feed material and formed slurry causes the formed slurry to be propelled through the interior chamber toward end wall 25, then to pass into the outer chamber 17 via header 29 (FIGS. 1 and 2) or the plurality of ports 30 in the inner cylinder 13 (FIG. 3) and through the return ducts 20, in a direction toward end wall 25'. The further exposure of the slurry to heat from tubes 19 causes the slurry to be transformed into a melt. A portion of the melt is taken off through outlet conduit 33 and a portion is returned to the interior chamber 15 and mixed with additional fusible divided material to form additional slurry which in turn is propelled through the device and transformed into additional melt.

The device of the present invention provides a means of carrying out a rapid melting process in a minimum of space without vesting a large amount of heat energy into the molten product in the form of superheat. The product yielded by the present invention is a melt of uniform temperature. The device is also readily adapted to melt materials which are subject to decomposition if exposed to air at elevated temperatures. These advantages are obtained by utilizing the device of the present invention to efficiently combine and transfer the heat from a melt of fusible material and the heat supplied by a heat exchange means to a supply of fusible divided material to form additional melt.

What is claimed is:

1. A continuous method of melting fusible divided solid material comprising the steps of feeding a fusible divided solid material into a melt of said solid material to form a slurry agitating and propelling said slurry through a heated zone to form a melt, then removing some of the melt utilizing, by recycling, the portion of melt remaining in the heating zone to mix with fresh solid material to form a fresh slurry, and adding fresh fusible solid material to the existing melt.

2. A heat exchange device for melting fusible divided solid material which comprises an outer shell having side and end walls and a generally cylindrical inner shell having side walls and ends the interior of said inner shell providing an interior chamber, said inner shell being mounted within and spaced from said outer shell side walls to provide an outer chamber therebetween said interior and outer chambers communicating one with the other through open means contiguous to the ends of said inner shell, a heat exchange conducting means in wall contact with said inner wall and in heat exchange relation to both of said chambers, said heat exchange conducting means positioned parallel to the axis of said inner shell a propulsion means comprising a screw having flight means extending generally along its axis mounted in said interior chamber positioned concentric with said inner shell to propel material through said device an inlet conduit entering through said outer shell positioned adjacent the inlet end of said inner shell providing a means of feeding fusible divided solid material into said interior chamber, and an outlet conduit entering through said outer shell positioned adjacent the downstream end of said outer shell providing a means of removing molten product from the device.

3. A heat exchange device for melting fusible divided solid material which comprises an outer shell having side and end walls and a generally cylindrical inner shell having side wall and open ends the interior of said inner shell providing an interior chamber, said inner shell being mounted within and spaced from said outer shell to provide an outer chamber therebetween said inner shell spaced from the end walls of said outer shell to provide a header in either end of the device, a plurality of spaced heat exchange tubes in said outer chamber in wall contact with and positioned parallel to the axis of said inner shell, a screw propulsion means comprising a screw having flight means extending generally along its axis mounted in said interior chamber positioned concentric with said inner shell to propel material through said interior chamber, an inlet conduit entering through said outer shell positioned adjacent the inlet end of said inner shell providing a means of feeding fusible divided solid material into said interior chamber, an outlet conduit located through the outer shell positioned adjacent the downstream end of said outer shell providing a means of removing molten product from the device.

4. The heat exchange device described in claim 3 wherein the screw propulsion means is mounted on a shaft and said shaft is hollow.

5. The heat exchange device described in claim 4 wherein said screw propulsion means is equipped with a hollow screw flight and said hollow screw flight communicates with said hollow shaft.

6. A heat exchange device for melting fusible divided solid material which comprises an inner shell defining an interior chamber, said inner shell having side walls and two open ends, an outer shell having side and end walls, said outer shell encompassing and spaced from the sides and ends of said inner shell to provide an outer chamber between the side walls of said shells and a first and second header between the ends of the inner shell and the end walls of the outer shell, a screw propulsion means comprising a screw having flight means extending generally along its axis positioned through said inner shell and in a concentric relation with said inner shell to propel material through said inner shell in a direction toward said first header, a plurality of heat exchange tubes in said outer chamber positioned in heat exchange relation to said interior chamber, said tubes in wall contact and positioned parallel to the axis of said inner shell, tioned parallel to the axis of said inner shell, a plurality of return ducts located in said outer chamber bounded by the inside surface of said outer shell, the outside surface of said inner shell and the outside surfaces of said tube members, an inlet conduit positioned through said outside shell positioned adjacent the inlet end of said inner shell providing a means of feeding fusible divided solid material into said interior chamber, and an outlet conduit through said outer shell positioned adjacent the downstream end of said outer shell providing a means of removing molten product from the device.

7. The device described in claim 6 wherein the shell members are cylindrical in shape and are coaxially aligned.

8. The device described in claim 6 wherein the screw propulsion means has a hollow shaft.

9. The device described in claim 8 wherein the said screw propulsion means is equipped with a hollow shaft flight and said hollow screw shaft communicates with said hollow screw flight.

10. The heat exchange device of claim 2 wherein the said propulsion means comprising a screw having flight means extending generally along its axis is a screw in the form of a conical helix and is positioned in the device so that the smallest diameter of said screw is located adjacent the inlet end of said inner shell.

11. A heat exchange device for melting fusible divided solid material which comprises an outer shell having side and end walls and a generally cylindrical inner shell having side walls and ends the interior of said inner shell providing an interior chamber, said inner shell being mounted within and spaced from said outer shell to provide an outer chamber therebetween said interior and outer chambers communicating one with the other through open means contiguous to the ends of said inner shell, a heat exchange conducting means in heat exchange relation to both of said chambers and to the communication space between said chambers, said heat exchange conducting means positioned parallel to the axis of said inner shell a propulsion means comprising a screw having flight means extending generally along its axis mounted in said interior chamber positioned to propel material through said device an inlet conduit entering through said outer shell positioned adjacent the inlet end of said inner shell providing a means of feeding fusible divided solid material into said interior chamber, and an outlet conduit entering through said outer shell positioned adjacent the downstream end of the outer shell providing a means of removing molten product from the device.

References Cited by the Examiner

UNITED STATES PATENTS

| | | | |
|---|---|---|---|
| 808,319 | 12/1905 | Valerius | 165—108 |
| 1,047,969 | 12/1912 | Meterns | 165—89 X |
| 1,091,097 | 3/1914 | Valerius | 165—92 |
| 2,071,624 | 2/1937 | Graham | 165—108 |
| 2,577,856 | 12/1951 | Nelson | 165—108 |
| 2,600,932 | 6/1952 | Smith | 165—108 |
| 2,731,241 | 1/1956 | Christian | 165—87 |
| 2,845,871 | 5/1958 | Comptor | 103—89 X |

ROBERT A. O'LEARY, *Primary Examiner.*

CHARLES SUKALO, *Examiner.*